United States Patent [19]

Katz et al.

[11] Patent Number: 4,702,356
[45] Date of Patent: Oct. 27, 1987

[54] ELASTIC COMPENSATION CHAMBER FOR HYDRAULIC ENERGY DISSIPATOR

[75] Inventors: Maurice Katz, Paris; Antoine Renard, Le Creusot, both of France

[73] Assignee: Jeumont-Schneider Corporation, Puteaux, France

[21] Appl. No.: 729,543

[22] Filed: May 2, 1985

[30] Foreign Application Priority Data

May 11, 1984 [FR] France ................................ 84 07264

[51] Int. Cl.$^4$ .............................................. F16F 9/08
[52] U.S. Cl. .................................. 188/315; 267/64.27
[58] Field of Search ........................ 188/315, 317, 298; 267/64.19, 64.11, 64.15, 64.23, 64.27

[56] References Cited

U.S. PATENT DOCUMENTS

| 2,815,829 | 12/1957 | Boehm et al. | 188/88 |
| 3,024,825 | 3/1962 | Stultz | 188/315 |
| 3,027,600 | 4/1962 | Stormer et al. | 18/56 |
| 3,389,903 | 6/1968 | Schmid | 267/64.19 |
| 3,819,166 | 6/1974 | Ellis et al. | 267/64 |
| 3,844,543 | 10/1974 | Whelan | 267/64.19 |
| 3,901,359 | 8/1975 | Jentsch | 188/315 |
| 3,945,663 | 3/1976 | Duckett | 280/124 |
| 4,178,015 | 12/1979 | Merriman et al. | 267/64.27 |
| 4,271,869 | 6/1981 | Weidl et al. | 188/314 X |

FOREIGN PATENT DOCUMENTS

| 629564 | 10/1961 | Canada . |
| 1782480 | 2/1957 | Fed. Rep. of Germany . |
| 2337665 | 2/1975 | Fed. Rep. of Germany . |
| 1313606 | 11/1962 | France . |
| 2238606 | 2/1975 | France . |
| 55-90738 | 9/1980 | Japan . |
| 942509 | 11/1963 | United Kingdom . |
| 947304 | 1/1964 | United Kingdom . |
| 974702 | 11/1964 | United Kingdom . |
| 1031167 | 5/1966 | United Kingdom . |

Primary Examiner—George E. A. Halvosa
Attorney, Agent, or Firm—Rines and Rines, Shapiro and Shapiro

[57] ABSTRACT

The invention provides an elastic compensation chamber, with variable volume, for a huydraulic energy dissipator of the telescopic type in which the elastic compensation chamber (20) is formed by one or more cylindrical sections (21) which only partially surround the working cylinder (1), to create large free spaces permitting an easy circulation of liquid between the said working cylinder (1) and the exterior tube (6) and in all directions, so as to accelerate the elimination of heat and avert a dangerous temperature elevation.

14 Claims, 9 Drawing Figures

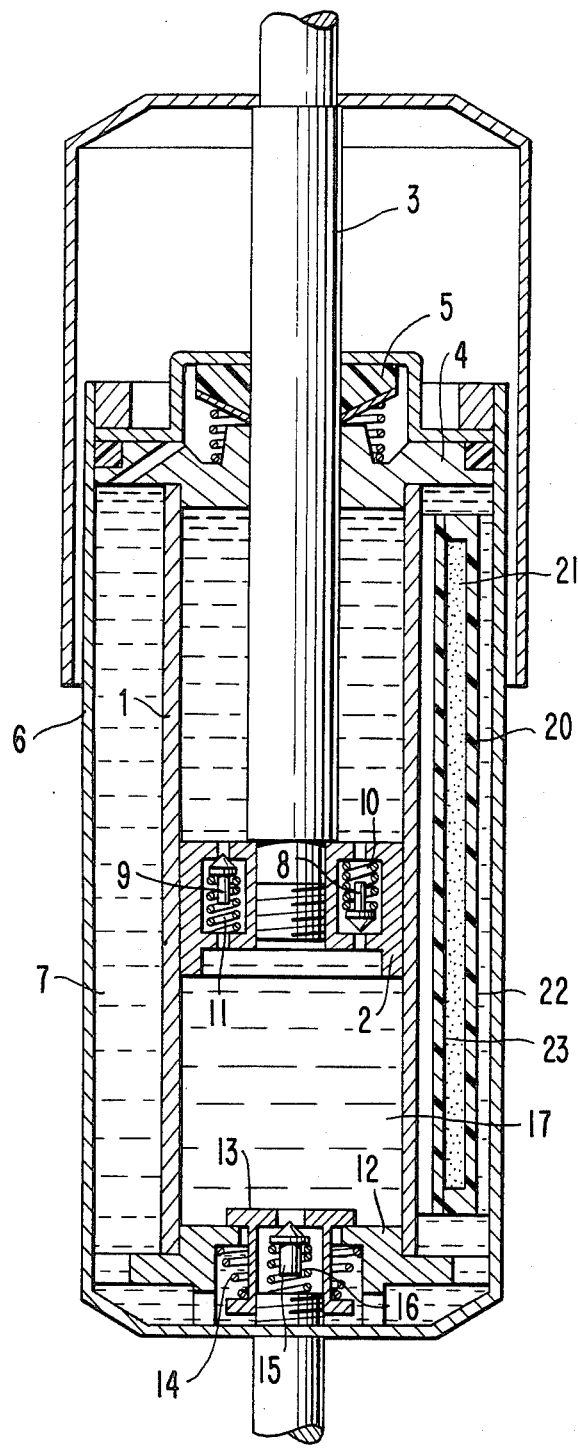
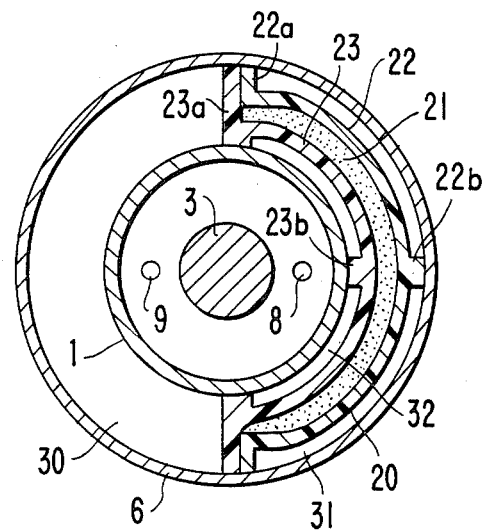
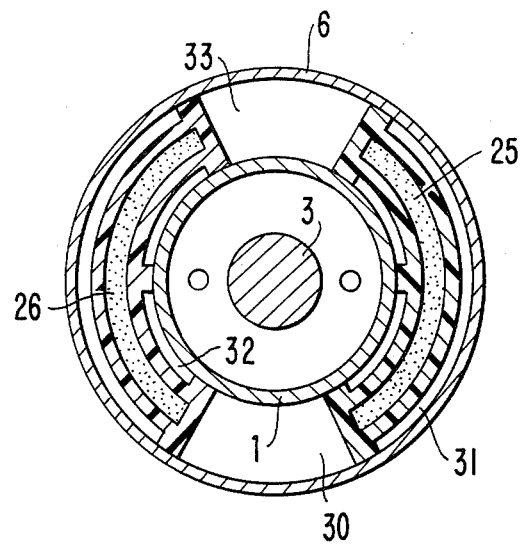

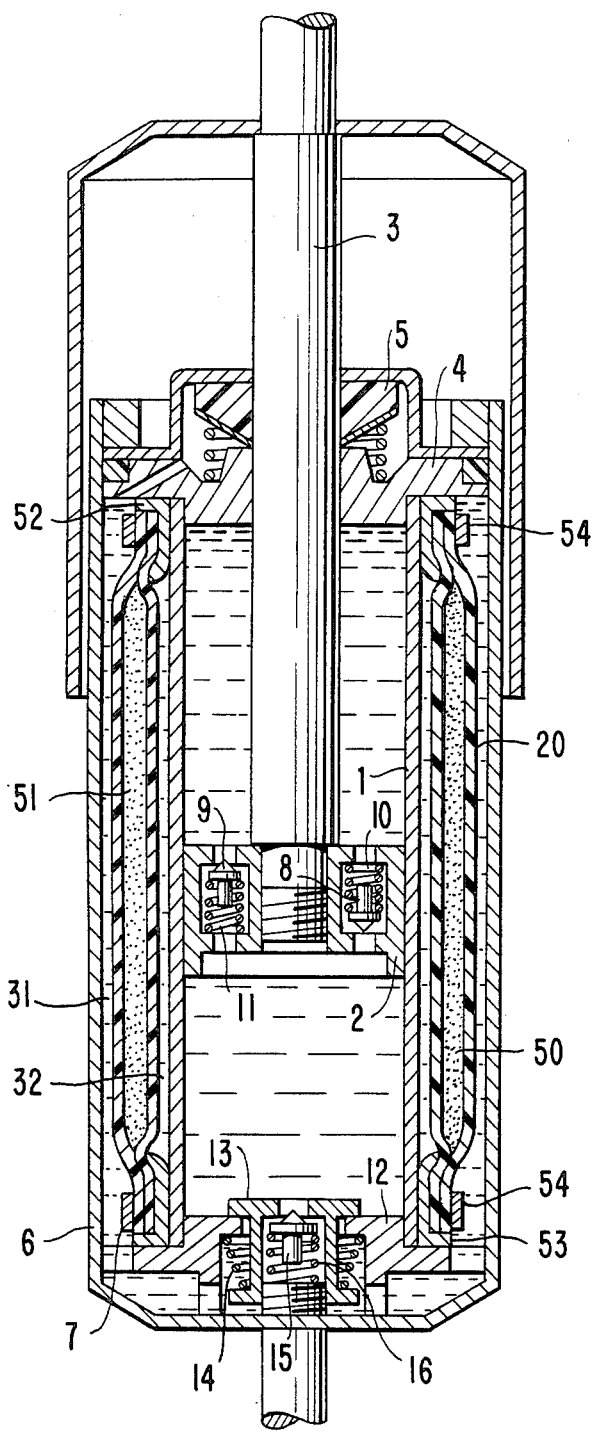
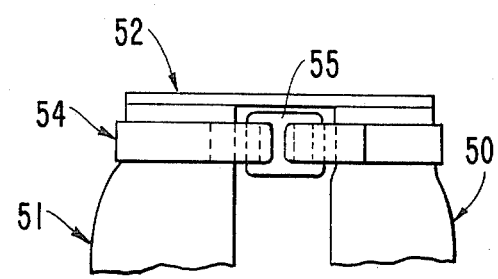
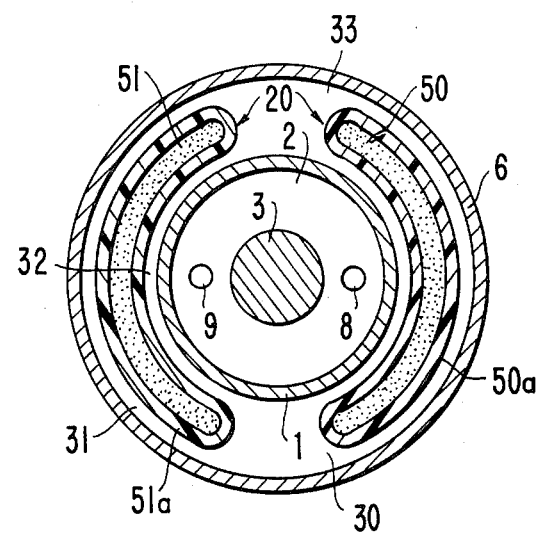
FIG. 6.
FIG. 7.
FIG. 8.

ELASTIC COMPENSATION CHAMBER FOR HYDRAULIC ENERGY DISSIPATOR

BACKGROUND OF THE INVENTION

The present invention relates to an elastic compensation chamber, with variable volume, with a telescopic form, to dissipate energy hydraulically, and is especially intended for the suspensions of railway rolling stock.

For these suspensions, the most common damper mechanisms, of the telescopic type, have a working cylinder filled with liquid and divided into two chambers by a piston equipped with calibrated valves determining the hydraulic resistance and whose shaft linked to the moving mass is guided through one of the faces of the cylinder. An annular volume surrounds the working cylinder and communicates through a calibrated valve with the working chamber opposite the piston shaft. Within the working cylinder, the variation of the volume of the incompressible liquid, resulting from the alternating movements of the shaft bearing the piston engenders braking forces which transform mechanical energy into heat.

The principal disadvantages of these devices result from the simultaneous presence of oil and ambient air within the various working chambers, which, at rest or at excessively small amplitudes of movement, provokes loss of priming of the mechanism due to the low level of the oil, engendering the phenomenon of cavitation.

In order to avoid such disadvantages, especially in the case of very low amplitude movements, as well as in the case in which the dissipator is called upon to assume some nearly horizontal position, and in order to compensate for the variation in liquid volume resulting from alternating movements of the shaft, hydraulic dissipators are used in which the reserve liquid within the surrounding annular volume is maintained under pressure by apparatus using mechanical springs or using elastic envelopes filled with air or some other gas under slight pressure.

However, these devices in general form an insulating screen around the working cylinder, thus hindering a rapid removal of the arising heat. This results in a rapid wear of the moving parts and even seizure, as well as decomposition of the oil employed, destruction of the joint seals, and of the elastic envelope itself.

While prior devices of this character (as in French patent No. 2,238,606—U.S. Pat. No. 3,945,663—and French patent No. 1,313,606, for example) involve similar shock absorbers including a deformable gas chamber, in all cases, this chamber acts as a thermal shield since it prevents the natural oil flow between the hot cylinder and the external tube at least in one sense (radial or axial) due to the fact that either the chamber is in close contact with the cylinder and the tube, or the chamber substantially surrounds the cylinder. Such a thermal shield results in the above-described disadvantages.

SUMMARY OF THE INVENTION

An object of the invention is to provide a novel elastic compensation chamber, with variable volume, for hydraulic energy dissipators, which enables these aforementioned disadvantages to be averted.

In summary the invention embodies a hydraulic energy dissipator having an elastic compensation chamber, with variable volume, formed by one or more independent cylindrical sections which only partially surround the working cylinder in order to create large free spaces enabling the liquid to circulate easily between the said working cylinder and the exterior tube of the dissipator. This arrangement is effective to accelerate the evacuation of heat, and to avoid a dangerous elevation of the internal temperature.

BRIEF DESCRIPTION OF THE DRAWINGS

The invention will be better understood by aid of the following description relating to particular modes of embodiment of the invention, given by way of example, and referring to the appended drawings, which show:

FIG. 1, an axial cross-section view of a hydraulic energy dissipator of the telescopic type, provided with an elastic chamber conforming to the invention;

FIG. 2, a transverse cross-section view of FIG. 1;

FIG. 3, a transverse cross-section view of a variation of the invention;

FIG. 6, an axial cross-section view of the hydraulic dissipator equipped with an elastic chamber according to another embodiment of the invention, FIG. 7, an enlarged view of one end of the elastic chamber represented in FIG. 6;

FIG. 8, a transverse cross-section view of FIG. 6;

DESCRIPTION OF THE PREFERRED EMBODIMENTS

Figure 4:
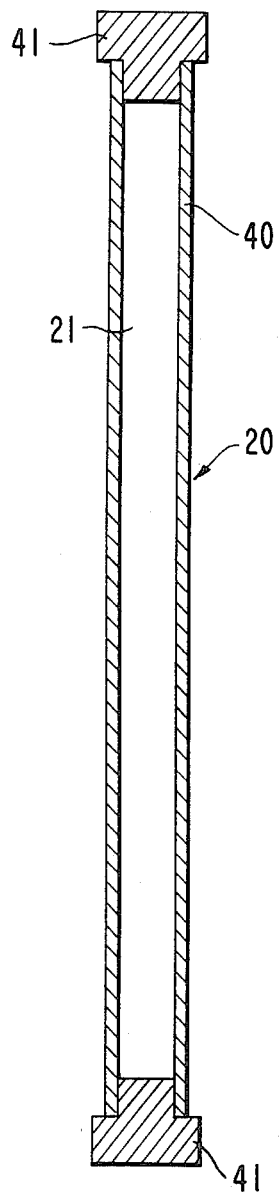
FIG. 4, an axial cross-section view of a variation of the elastic chamber.

Referring first to FIG. 1, the hydraulic energy dissipator comprises a working cylinder 1, completely filled with liquid, and within which moves a piston 2, solidly attached to a shaft 3, which passes through a counter-piston 4 and an hermetic seal assembly 5. The working cylinder is surrounded by an exterior tube 6, forming with the cylinder an annular volume 7.

The piston 2 is equipped with valves (8, 9) loaded respectively by calibrated springs (10, 11), which oppose the resistance determined for passage of the liquid in the two directions of movement, thus transforming the mechanical energy transmitted by the shaft 3 into heat, which raises the temperature of the liquid.

The working cylinder 1, on the side opposite from the shaft 3, is obstructed by a flange 12. Flange 12 carries a valve 13 maintained within its seat in a closed position by means of a weak spring 14, and a valve 15 loaded by a spring 16. The valve 13 opens large passages to the liquid during aspiration of the piston 2, from the annular volume 7 to the working chamber 17, and, in the opposite direction, the valve 15 opens a restricted passage toward the annular volume 7.

Within the annular volume 7, completely filled with liquid, there is an elastic compensation chamber, designated in its entirety by the number 20. This chamber has variable volume and is filled with air or other gas under slight pressure. The chamber may be formed by one or more independent cylindrical sections, only partially surrounding the working cylinder. The contained volume of air or other gas is determined as a function of the maximum volume of the submerged shaft 3, with a margin for thermal expansion of the totality of the liquid, and a minimum volume of residual gas necessary so as not to attain an excessive pressure at the end of the compression.

In FIGS. 1 and 2, the compensation chamber 20, disposed within the annular volume 7, consists of only a single cylindrical section 21. Section 21 surrounds only half of the working cylinder 1, and creates large free spaces (30, 31, 32) which permit easy circulation of the liquid between the working cylinder 1 and the exterior tube 6, so as to accelerate the evacuation of heat and to avert a dangerous elevation of the interior temperature. This cylindrical section 21 is formed of two rubber half shells (22, 23). Each half shell can be molded into shape at the desired length, then joined by a process of heat fusion to the other section at their lateral borders (22a, 23a) to obtain hermetic joints and to form a flexible chamber containing a certain volume of air at atmospheric pressure. The exterior surface of each of the half shells (22, 23) includes longitudinal tongues (22b, 23b) resulting directly from the molding and which, in conjunction with the lateral borders (22a, 23a), form supports which maintain the chamber 20 apart from the working cylinder 1 and the exterior tube 6, and ensure its positioning within the annular volume 7.

The shaft 3 receives all inward and outward movements to be damped, and the valves (8, 9) loaded respectively by the calibrated springs (10, 11) present determined resistances to the passage of liquid in the two directions of movement, thus transforming the mechanical energy transmitted by the shaft 3 into heat, which causes the temperature of the liquid to rise. The volume of the submerged portion of the shaft 3 during a compression movement necessarily drives an equal volume of the liquid contained within the working cylinder 1 through the valve 15 loaded by the spring 16. This excess of liquid passes into the annular volume 7. The liquid being incompressible, it is the elastic compensation chamber 20 which is compressed, in order to absorb this excess liquid, thus increasing the pressure of the air contained within the chamber. In the case of an extension movement, and following this sequence, the compressed air in the chamber 20 expands and pushes the liquid back through the valve 13, into the working cylinder 1. Working cylinder 1 therefore at all times remains filled, so that the piston 2 encounters resistance during all of its movements. One can thus appreciate the important role of the elastic compensation chamber 20 for good functioning of the damper.

Since the compensation chamber 20 only partially surrounds the working cylinder 1, liquid circulates easily between that cylinder and the exterior tube 6 through the free spaces (30, 31, 32). The free circulation of liquid accelerates the elimination of heat, and thus prevents dangerous elevation of the internal temperature.

In the particular case of hydraulic dissipation of energy with a reduced diametric requirement, the elastic compensation chamber can be formed by a number of independent cylindrical sections (25, 26), each occupying a smaller portion (FIG. 3), at the same time creating large free spaces (30, 31, 32, 33) between the working cylinder 1 and the exterior tube 6, for the circulation of liquid and removal of heat. Each small section (25, 26), as in the preceding example, consists of two rubber half shells molded into shape with the desired length, and heat-fused to one another.

Figure 5:
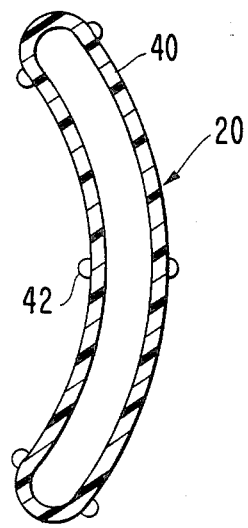
FIG. 5, a transverse cross-section view of FIG. 4.

According to a variation of the invention represented in FIGS. 4 and 5, the cylindrical section 21 of the compensation chamber 20 may also be formed by a tube 40 molded into shape, at each end of which is attached a plug 41. The exterior faces of the tube 40 include longitudinal tongues 42 resulting directly from the molding, which maintain the chamber 20 apart from the working cylinder and from the exterior tube, and ensure its positioning within the annular volume.

Now, with reference to FIGS. 6 to 8, another embodiment of the elastic compensation chamber for an energy dissipator will be described.

The elastic compensation chamber 20 consists of two cylindrical sections (50, 51), each formed by a rubber tube (50a, 51a), round or flattened, and resting on two rings (52, 53). Each tube (50a, 51a) is closed hermetically at its ends, with or without prior application of adhesive, by metal bands 54 or other means, and clamped strongly with a ring clip or other means to a loop 55. These sections (50a, 51a), which can vary in number, are arranged so as again to leave large free spaces (30, 31, 32, 33) to enable easy circulation of liquid and to accelerate the removal of heat. The volume of air or other gas within the tubes is likewise determined as a function of the maximum volume of the submerged shaft 3, with a margin for thermal expansion of the whole of the liquid, and a minimum residual gas volume so as not to attain an excessive pressure at the end of compression. An installation mandrel with a limiter of external diameter enables the volume calculated on this basis to be obtained.

Figure 9:
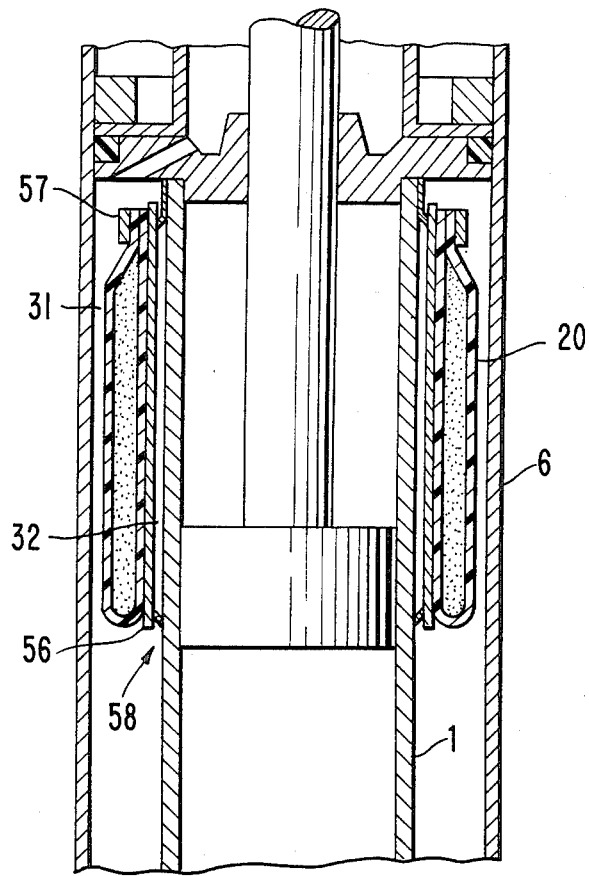
FIG. 9, a partial axial cross-section view of another variation of the invention.

In the variation of FIG. 9, the rubber tube constituting the elastic compensation chamber 20, mounted on a thin tube 56, is folded back upon itself so as to bring its two ends together. The ends, whether attached with adhesive or not, are clamped with a wire wrapped several times, or a suitable band 57, after an external diameter determining the necessary volume of gas is obtained, for example by inflation by means of a fine tubular needle. The tube 56 is held on the working cylinder 1 by means of a number of pins, cut off or pressed down at the two ends, so as to leave, as in the preceding examples, large free spaces (31, 32) to enable liquid circulation necessary for elimination of the heat produced, through the exterior tube 6.

The folded-back portion of the tube can be constituted by a separate concentric tube of larger diameter, and, fastened with adhesive or not, mechanically clamped hermetically at the two ends.

It is also possible to provide an elastic compensation chamber having a relatively large annular area, for the same necessary volume, but with a shorter length, which leaves a portion of the working cylinder uncovered and in direct communication with the exterior tube 6 through the liquid, thus favoring the flow of the heat produced within the working cylinder.

Naturally, it is possible, without departing from the framework of the invention, to conceive of variations and refinements of details, and to envision the use of other equivalent means.

We claim:
1. A hydraulic energy dissipator of the telescopic type comprising, in combination, a working cylinder filled with liquid and separated into two chambers by a piston supported on a shaft for movement within said working cylinder, calibrated valve means carried by said piston for effecting predetermined hydraulic resistance to movement imparted to said piston by said shaft in order to transform mechanical energy applied to said shaft into heat, a liquid-filled exterior tube surrounding said working cylinder and defining therewith an annular volume which surrounds said working cylinder, said annular volume being in communication by way of additional calibrated valve means with said working cylinder, and elastic compensation chamber means within said annular volume including one or more gas-filled cylindrical sections of variable volume which only partially surround said working cylinder, each said cylindrical section having protuberances projecting outward from opposite exterior surfaces thereof into engagement with said working cylinder and said exterior tube and supporting said cylindrical section in a fixed position within said annular volume and such that a major portion of said cylindrical section is held spaced from said working cylinder and said exterior tube, said one or more cylindrical sections leaving large free spaces adjacent thereto between and along said working cylinder and said exterior tube, which spaces permit relatively free circulation of liquid within said annular volume, between and along said working cylinder and said exterior tube, and thereby promote removal of heat from said working cylinder so as to avoid dangerous temperature elevation of said dissipator.

2. A hydraulic energy dissipator according to claim 1, wherein said protuberances comprise longitudinal tongues formed integrally with said exterior surfaces.

3. A hydraulic energy dissipator according to claim 2, wherein said protuberances include integral projecting longitudinal members at the lateral ends of each said cylindrical section.

4. A hydraulic energy dissipator according to claim 1, having at least one said cylindrical section formed of two half-shells of elastic gas-impermeable material hermetically sealed to one another at their lateral ends.

5. A hydraulic energy dissipator according to claim 1, having at least one said cylindrical section formed by a tube of elastic gas-impermeable material having plugs inserted into its opposite ends.

6. A hydraulic energy dissipator of the telescopic type comprising, in combination, a working cylinder filled with liquid and separated into two chambers by a piston supported on a shaft for movement within said working cylinder, calibrated valve means carried by said piston for effecting predetermined hydraulic resistance to movement imparted to said piston by said shaft in order to transform mechanical energy applied to said shaft into heat, a liquid-filled exterior tube surrounding said working cylinder and defining therewith an annular volume which surrounds said working cylinder, said annular volume being in communication by way of additional calibrated valve means with said working cylinder, and elastic compensation chamber means within said annular volume including one or more gas-filled cylindrical sections of variable volume which only partially surround said working cylinder, each said cylindrical section having opposite longitudinal ends secured respectively to a pair of rings disposed toward opposite longitudinal ends of said annular volume, said rings supporting said cylindrical section with a major portion of said cylindrical section suspended between said rings spaced from said working cylinder and said exterior tube, said one or more cylindrical sections leaving large free spaces adjacent thereto between and along said working cylinder and said exterior tube, which spaces permit relatively free circulation of liquid within said annular volume, between and along said working cylinder and said exterior tube, and thereby promote removal of heat from said working cylinder so as to avoid dangerous temperature elevation of said dissipator.

7. A hydraulic energy dissipator according to claim 6, wherein at least one said cylindrical section is formed by a tube of elastic gas-impermeable material with opposite longitudinal ends which are hermetically sealed and which are secured on said rings.

8. A hydraulic energy dissipator according to claim 7, wherein said opposite longitudinal ends of said elastic tube are hermetically sealed by respective mechanical ring clips secured to the respective rings.

9. A hydraulic energy dissipator according to claim 8, wherein said opposite tube ends are held closed with adhesive.

10. A hydraulic energy dissipator of the telescopic type comprising, in combination, a working cylinder filled with liquid and separated into two chambers by a piston supported on a shaft for movement within said working cylinder, calibrated valve means carried by said piston for effecting predetermined hydraulic resistance to movement imparted to said piston by said shaft in order to transform mechanical energy applied to said shaft into heat, a liquid-filled exterior tube surrounding said working cylinder and defining therewith an annular volume which surrounds said working cylinder, said annular volume being in communication by way of additional calibrated valve means with said working cylinder, and elastic compensation chamber means within said annular volume including a gas-filled cylindrical section of variable volume surrounding sid working cylinder only partially, said cylindrical section having a major portion thereof supported spaced from said working cylinder and said exterior tube on a small tube mounted within said annular volume spaced from said working cylinder and said exterior tube, with at least one longitudinal end of said cylindrical section being firmly secured by mechanical ring clip means to said small tube, said cylindrical section and said small tube leaving large free spaces adjacent thereto between and along said working cylinder and said exterior tube, which spaces permit relatively free circulation of liquid within said annular volume, between and along said working cylinder and said exterior tube, and thereby promote removal of heat from said working cylinder so as to avoid dangerous temperature elevation of said dissipator.

11. A hydraulic energy dissipator according to claim 10, wherein said cylindrical section is formed from an elastic tube folded back upon itself so as to have its opposite ends brought together, said opposite ends being secured to said small tube by said mechanical ring clip means and hermetically sealed by said mechanical ring clip means.

12. A hydraulic energy dissipator according to claim 11, wherein said opposite ends of said elastic tube are held together with adhesive.

13. A hydraulic energy dissipator according to claim 10, wherein said small tube is supported within said annular space by a number of pins which connect opposite ends of said small tube to said working cylinder.

14. A hydraulic energy dissipator according to claim 10, wherein said cylindrical section is formed from concentric tubes hermetically sealed together at their adjacent longitudinal ends.

* * * * *